United States Patent
Martin et al.

(10) Patent No.: US 11,500,836 B2
(45) Date of Patent: Nov. 15, 2022

(54) SYSTEMS AND METHODS OF CREATION AND DELETION OF TENANTS WITHIN A DATABASE

(71) Applicant: salesforce.com, inc., San Francisco, CA (US)

(72) Inventors: Jameison Bear Martin, Oakland, CA (US); Nathaniel Wyatt, San Francisco, CA (US); Gary J. Baker, Glenbrook, NV (US); Randy Spalten, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 170 days.

(21) Appl. No.: 15/634,786

(22) Filed: Jun. 27, 2017

(65) Prior Publication Data

US 2018/0373741 A1 Dec. 27, 2018

(51) Int. Cl.
*G06F 16/21* (2019.01)
*G06F 16/22* (2019.01)
*G06F 21/62* (2013.01)
*G06F 16/27* (2019.01)

(52) U.S. Cl.
CPC ............ *G06F 16/217* (2019.01); *G06F 16/22* (2019.01); *G06F 16/27* (2019.01); *G06F 21/6218* (2013.01)

(58) Field of Classification Search
CPC ........ G06F 16/217; G06F 16/22; G06F 16/27; G06F 16/2282; G06F 21/6227
USPC ........................................................ 707/804
See application file for complete search history.

(56) References Cited

U.S. PATENT DOCUMENTS

| 8,095,618 | B2 * | 1/2012 | Lewis ................... G06Q 30/02 709/213 |
| 8,904,555 | B2 * | 12/2014 | Ramesh ................. G06Q 10/06 726/28 |
| 9,317,706 | B2 * | 4/2016 | Kaushik .............. G06F 21/6209 |
| 9,779,269 | B1 * | 10/2017 | Perlman ................ H04L 9/0822 |
| 10,657,004 | B1 * | 5/2020 | Dalmia ................. G06F 16/128 |
| 2005/0065925 | A1 * | 3/2005 | Weissman ........... G06F 21/6218 |

(Continued)

OTHER PUBLICATIONS

Elena Filatova, Vasileios Hatzivassiloglou, and Kathleen McKeown. 2006. Automatic creation of domain templates. In Proceedings of the COLING/ACL on Main conference poster sessions (COLING-ACL '06). Association for Computational Linguistics, USA, 207-214. (Year: 2006).*

(Continued)

*Primary Examiner* — Brittany N Allen
(74) *Attorney, Agent, or Firm* — Butzel Long

(57) ABSTRACT

System and methods are provided for creating a tenant of a database system, the tenant to have tenant data stored in an immutable storage of the database system associated with a tenant identifier. A request may be received at the database system to create a new tenant. A template tenant metadata of a template tenant may be selected at the database system to create the new tenant based on the received request. A new tenant identifier may be created at the database system based on the selected template tenant metadata. The new tenant may be created by associating the new tenant identifier with a snapshot of at least a portion of the template tenant metadata at a point in time when the template tenant metadata is made accessible to the new tenant. Systems and methods are also provided for removing a tenant of a database system by removing references to a tenant identifier.

6 Claims, 11 Drawing Sheets

(56) References Cited

U.S. PATENT DOCUMENTS

| | | | | |
|---|---|---|---|---|
| 2007/0156650 | A1* | 7/2007 | Becker | G06F 16/958 |
| 2007/0156699 | A1* | 7/2007 | Becker | G06F 16/958 |
| 2007/0156700 | A1* | 7/2007 | Becker | G06F 16/958 |
| 2007/0156901 | A1* | 7/2007 | Becker | H04L 67/306 709/226 |
| 2008/0162483 | A1* | 7/2008 | Becker | G06F 21/6218 |
| 2008/0162490 | A1* | 7/2008 | Becker | G06F 16/27 |
| 2008/0162622 | A1* | 7/2008 | Becker | G06F 16/25 709/201 |
| 2009/0216796 | A1* | 8/2009 | Slik | G06F 16/164 |
| 2010/0250608 | A1* | 9/2010 | Malviya | G06F 16/217 707/792 |
| 2011/0214062 | A1* | 9/2011 | Doshi | G06F 16/955 715/738 |
| 2011/0219046 | A1* | 9/2011 | Nesmyanovich | G06F 16/00 707/812 |
| 2013/0191350 | A1* | 7/2013 | Esaka | H04L 67/1097 707/692 |
| 2014/0075565 | A1* | 3/2014 | Srinivasan | H04L 63/10 726/26 |
| 2015/0019590 | A1* | 1/2015 | Brooks | G06F 16/214 707/792 |
| 2015/0142844 | A1* | 5/2015 | Bruce | G06F 16/2471 707/760 |
| 2015/0193481 | A1* | 7/2015 | McGrath | G06F 11/3409 707/638 |
| 2016/0080221 | A1* | 3/2016 | Ramachandran | H04L 12/4633 709/224 |
| 2016/0170987 | A1* | 6/2016 | Kesselman | G06F 16/2255 707/747 |
| 2018/0300305 | A1* | 10/2018 | Lam | G06F 17/248 |

OTHER PUBLICATIONS

Wei Chen, Beijun Shen and Zhengwei Qi, "Template-based business logic customization for SaaS applications," 2010 IEEE International Conference on Progress in Informatics and Computing, 2010, pp. 584-588 (Year: 2010).*

R. Xiaojun, Z. Yongqing and K. Lanju, "SaaS Template Evolution Model Based on Tenancy History," 2013 Third International Conference on Intelligent System Design and Engineering Applications, 2013, pp. 1242-124 (Year: 2013).*

IP.com Prior Art Database, Method and System for Allowing On-Demand Extension of database Schema in a Multi-Tenant System, Mar. 19, 2014 (Year: 2014).*

Yosuke Himura and Yoshiko Yasuda. 2012. Discovering configuration templates of virtualized tenant networks in multi-tenancy datacenters via graph-mining. SIGCOMM Comput. Commun. Rev. 42, 3 (Jul. 2012), 13-20. (Year: 2012).*

R. Xiaojun, Z. Yongqing and K. Lanju, "SaaS Template Evolution Model Based on Tenancy History," 2013 Third International Conference on Intelligent System Design and Engineering Applications, 2013, pp. 1242-1247, doi: 10.1109/ISDEA.2012.293. (Year: 2013).*

PCT Invitation to Pay Additional Fees with Annex to Form PCT/ISA/206 Communication Relating to the Results of the Partial International Search for PCT/US2018/039452, dated Sep. 5, 2018, 17 pages.

International Preliminary Report on Patentability for Application No. PCT/US2018/039452, dated Dec. 31, 2019, 16 pages.

Paulo Ricardo Motta Gomes, "Distributed Deduplication in a Cloud-based Object Storage System", Instituto Superior Tecnico, Jul. 30, 2012 (Jul. 30, 2012), pp. 1-108, XP055524444, Lisbon, Portugal Retrieved from the Internet: URL: https://pauloricardomg.files.wordpress.com/2012/08/thesis-paulo.pdf retrieved on Nov. 16, 2018.

Australian Examination Report No. 1 for App. No. AU2018290753, dated Aug. 7, 2020, 5 pages.

Australian Examination Report No. 2 for App. No. AU2018290753, dated Oct. 26, 2020, 3 pages.

Australian Examination Report No. 3 for App. No. AU2018290753, dated Jan. 14, 2021, 3 pages.

Japanese Office Action (with English translation) for App. No. JP2019-572099, dated Dec. 22, 2020, 6 pages.

Australian Examination Report No. 4 for App. No. AU2018290753, dated Mar. 31, 2021, 3 pages.

Japanese Office Action (with English translation) for App. No. JP2019-572099, dated May 25, 2021, 10 pages.

* cited by examiner

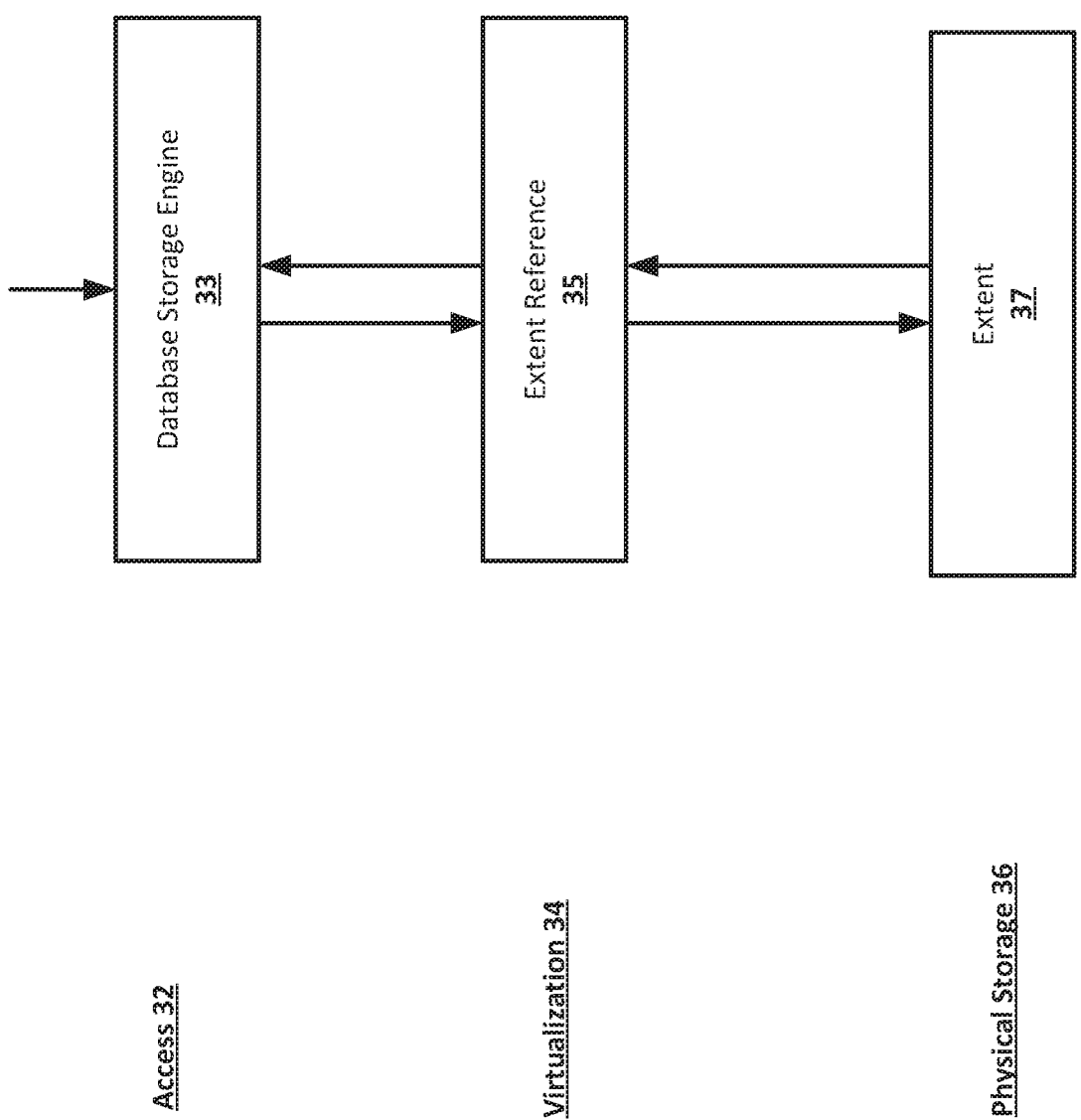

FIG. 4C

| Eid | Key Start | Key End | Xst | Xend |
|-----|-----------|---------|-----|------|
| E1  | Key1      | Key2    | x1  | x2   |

Snapshot of Template 304

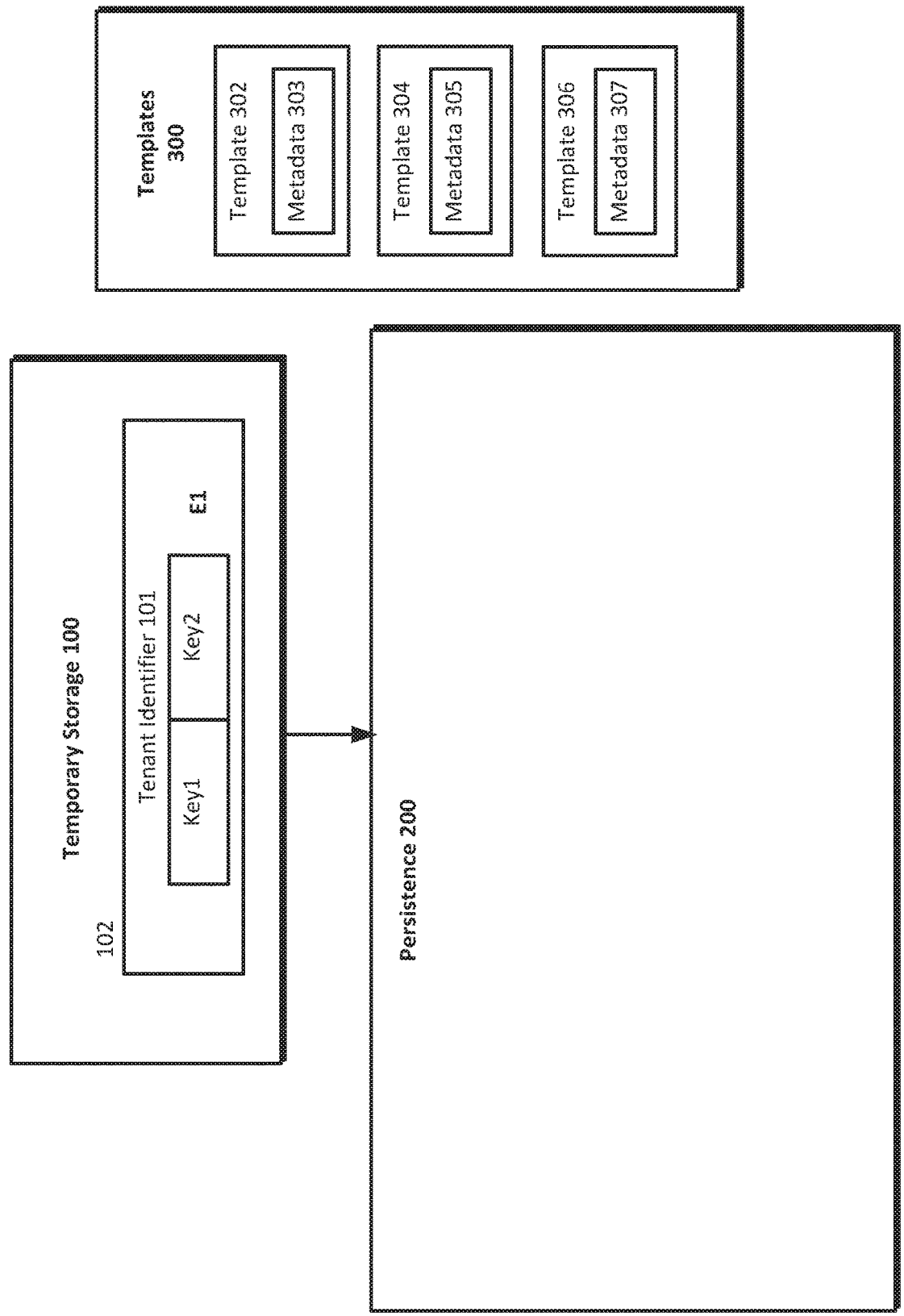

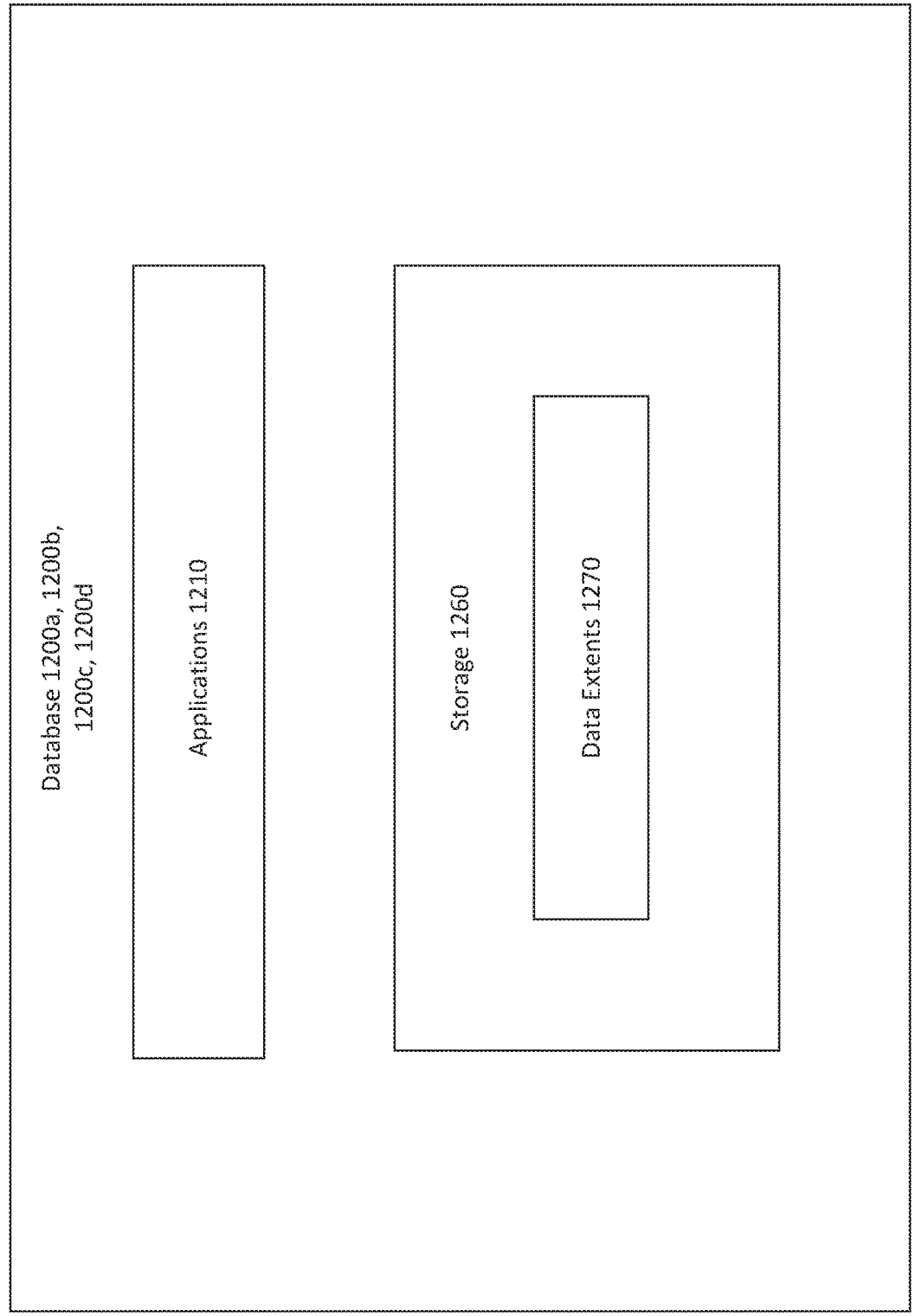

SYSTEMS AND METHODS OF CREATION AND DELETION OF TENANTS WITHIN A DATABASE

BACKGROUND

In a database system, tenants typically go through a lifecycle from creation to deletion. That is, a tenant is created within a database, is used for a period of time, and is eventually deleted.

A substantial number of records are typically created when a new tenant is created in a traditional database. Each of these records needs to be inserted into the database system individually, which can take time and utilize computational and hardware resources.

When a typical database system receives a request to delete a tenant, the database system will undergo a time-consuming and resource-consuming process of deleting, row-by-row, tenant data associated with the tenant.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than may be necessary for a fundamental understanding of the disclosed subject matter and various ways in which it may be practiced.

FIG. 3 shows an example system for creating a tenant, storing and retrieving tenant data, and removing a tenant using a virtualization layer according to an implementation of the disclosed subject matter.

FIGS. 4A-4E show example systems and methods of creating a new tenant using template tenant metadata according to an implementation of the disclosed subject matter.

FIGS. 6A-6B show a network configuration according to an implementation of the disclosed subject matter.

DETAILED DESCRIPTION

Figure 1A:
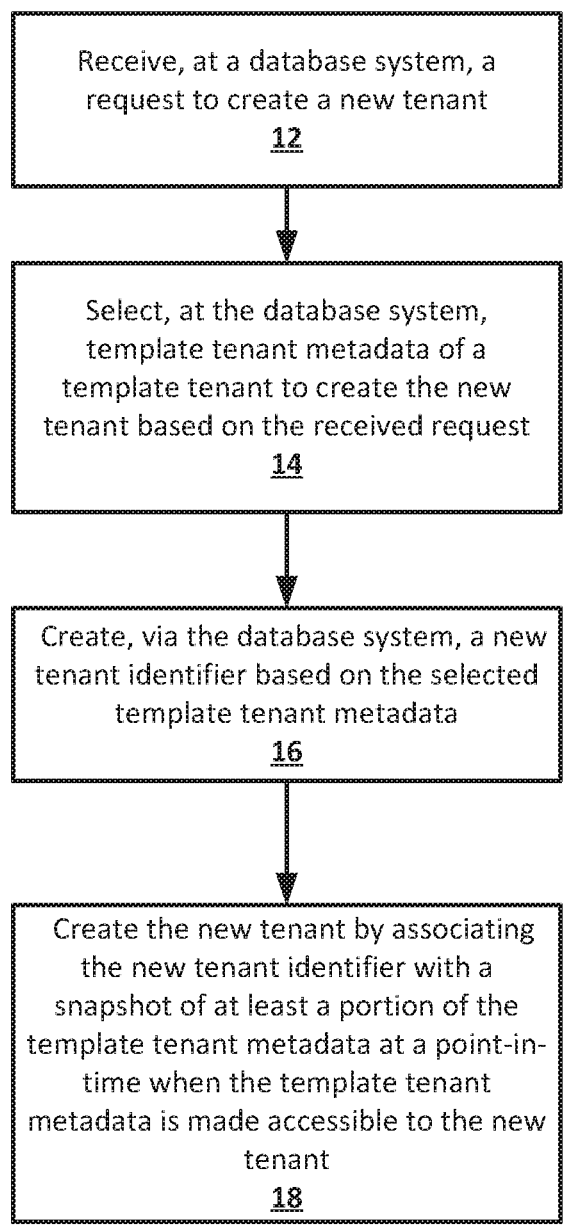
FIG. 1A shows an example method for creating a tenant of a database system using template tenant metadata according to an implementation of the disclosed subject matter.

Implementations of the disclosed subject matter are directed to creation of tenants from data stored in a template tenant. In traditional database systems, new tenants are created by adding records, row-by-row, to the database. The implementations of the disclosed subject matter reduce the amount of time, as well as computational and hardware resources, to create a new tenant by having tenant identifiers of the new tenant point to metadata of the template so that no row-by-row adding or copying of data is needed in creating a tenant.

When a request to create a new tenant is received, the database system of the disclosed subject matter may determine whether the system has performed a signup (e.g., within a particular period of time) using a particular template tenant and/or a template tenant that is similar to the received request. If so, a snapshot of the template tenant (e.g., the template tenant data, edition information, or the like) may be used to create the new tenant. In particular, the snapshot may become the new tenant, and has metadata that point to portions of the data of the template tenant from which the snapshot was taken.

Implementations of the disclosed subject matter are also directed to the removal and/or deletion of tenants from a database. Traditionally, tenants and tenant data are removed row-by-row from a database. The database system of the disclosed subject matter more quickly removes a tenant from the system by removing metadata references to the tenant in the database. That is, the database system of the disclosed subject matter does not have to issue individual delete operations to remove data from the rows of the database. Rather, one or more operations may be performed to remove references to those rows containing tenant data from the database by removing the references to the tenant data.

Implementations of the disclosed subject matter provide a method for creating a tenant of a database system, the tenant to have tenant data stored in an immutable storage of the database system associated with a tenant identifier. A request may be received at the database system to create a new tenant. Template tenant metadata of a template tenant may be selected at the database system to create the new tenant based on the received request. A new tenant identifier may be created at the database system based on the selected template tenant metadata. The new tenant may be created by associating the new tenant identifier with a snapshot of at least a portion of the template tenant metadata at a point in time when the template tenant metadata is made accessible to the new tenant.

The method may include associating new tenant data created by the new tenant after the new tenant creation point in time with the new tenant, where the new tenant data created by the new tenant subsequent to the new creation point in time is inaccessible to the template tenant.

In the method, the selecting the template tenant metadata of the template tenant may include determining whether a template tenant exists based on a type of the request to form a new tenant, and creating the new tenant by associating the new tenant identifier with the snapshot of at least a portion of template tenant metadata of the determined template tenant at a point in time when the new tenant is to be created.

In some implementations, when the new tenant is created, data of the new tenant may be changed by setting a permission, changing a layout, and/or changing a username, or the like. Implementations of the disclosed subject matter provide a method for removing a tenant of a database system, the tenant having tenant data stored in an immutable storage of the database system associated with a tenant identifier. The database system may receive a request to remove the tenant. Metadata may be removed for the tenant from the database system based on the received request. References to the tenant identifier for the tenant may be removed from the database system without deleting, row-by-row, tenant data associated with the tenant identifier in the database system. The method may include removing at least one key associated with the metadata of the tenant without changing other tenant data.

In some implementations, this may include removing a key range associated with the metadata of a tenant from the immutable storage without removing physical data stored in the immutable storage.

Implementations of the disclosed subject matter may also provide a system to create a tenant of a database system. At least one server of the system may receive a request to create a new tenant, select template tenant metadata of a template tenant to create the new tenant based on the received request, create a new tenant identifier based on the selected template tenant metadata, and create the new tenant by associating the new tenant identifier with a snapshot of at least a portion of the template tenant metadata at a point in time when the template tenant metadata is made accessible to the new tenant. The system may include at least one storage device to store tenant data associated with the tenant identifier and the template tenant.

At least one server of the database system may associate new tenant data created by the new tenant after the new tenant creation point in time with the new tenant. The new tenant data created by the new tenant subsequent to the new creation point in time is inaccessible to the template tenant.

At least one server of the database system may select the template tenant metadata of the template tenant by determining whether a template tenant exists based on a type of the request to form a new tenant. The server may create the new tenant by associating the new tenant identifier with the snapshot of at least a portion of the template tenant metadata of the template tenant at a point in time when the new tenant is to be created.

When the new tenant is created by the system, at least one server of the database system may change tenant data of the new tenant by changing a permission, changing a layout, and/or changing a username, or the like.

Implementations of the disclosed subject matter may also provide a system to remove a tenant of a database system. The system may include at least one storage device to store tenant data associated with a tenant identifier. At least one server of the system may receive a request to remove the tenant from the at least one storage device, remove metadata for the tenant from the database system based on the received request, and remove references to the tenant identifier for the tenant from the database system without deleting, row-by-row, tenant data associated with the tenant identifier in the database system.

In some implementations, at least one server of the database system may remove the metadata by removing at least one key associated with the tenant without changing other tenant data. The server of the system may remove at least one key by removing a key range associated with the metadata of a tenant from the immutable storage without removing physical data stored in the at least one storage.

FIG. 1A shows an example method 10 for creating a tenant of a database system using template tenant metadata according to an implementation of the disclosed subject matter. The tenant for the database system created using method 10 may have tenant data stored in an immutable storage (e.g., such as in system 30 shown in FIG. 3, storage 810 of second computer 800 shown in FIG. 5, database systems 1200a-d of FIGS. 6A-6B, and the like) of the database system and be associated with a tenant identifier. As described below, the method 10 may be used in connection with system 50 shown in FIGS. 4A-4E and described below to create a tenant using a template tenant.

The system 50 of FIGS. 4A-4E may be a database system, server system, cloud server system, or the like. The system 50 may include temporary storage 100, persistence 200, and log 300. The persistence 200 may have one or more servers and/or computers associated with it (e.g., system 30 shown in FIG. 3, computer 600 and/or computer 800 shown in FIG. 5, and/or database systems 1200a-1200d shown in FIGS. 6A-6B). The temporary storage 100, may be any suitable combination of hardware and software on the system 50 for storing key ranges for data in extents before a "flush" operation to store the information in persistence 200, which may be may be any suitable combination of hardware and software on the system 50 for storing data extents and data extent references. Templates 300 may be stored on any combination of hardware and software on the system 50 to store template tenants and metadata that may be used by the system to create a new tenant.

Figure 4A:
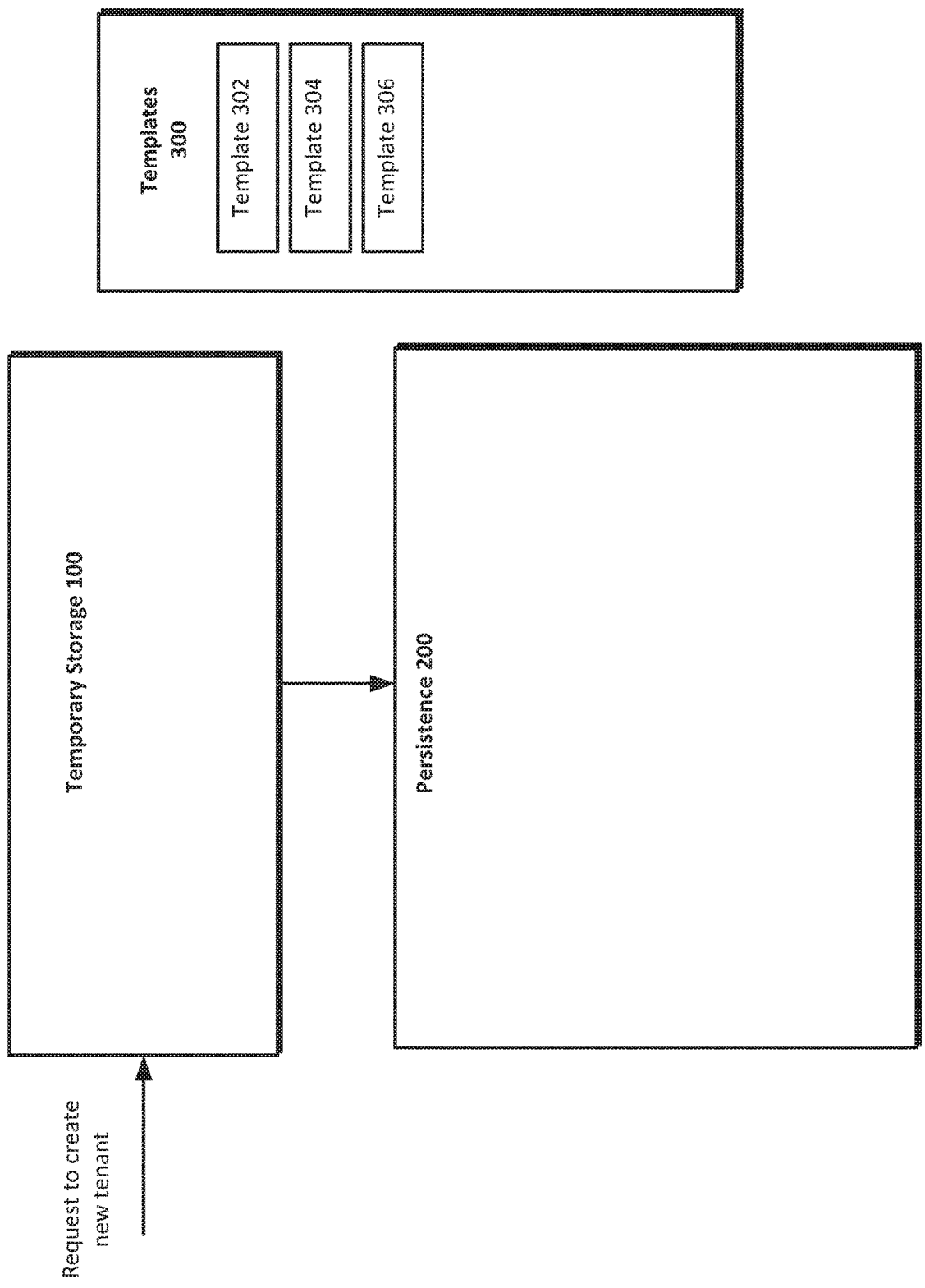

At operation 12 of FIG. 1A, the database system may receive a request to create a new tenant. For example, the database storage engine 33 of the access layer 32 shown in FIG. 3 and described below may receive the request. In another example, the computer 600, central component 700, and/or second computer 800 shown in FIG. 5 and described below may receive the request. In yet another example, one or more of the database systems 1200a-d shown in FIGS. 6A-6B and described below may receive the request. Operation 12 is also shown in FIG. 4A, where the temporary storage 100 of system 50 receives a request to create a new tenant.

Figure 4B:
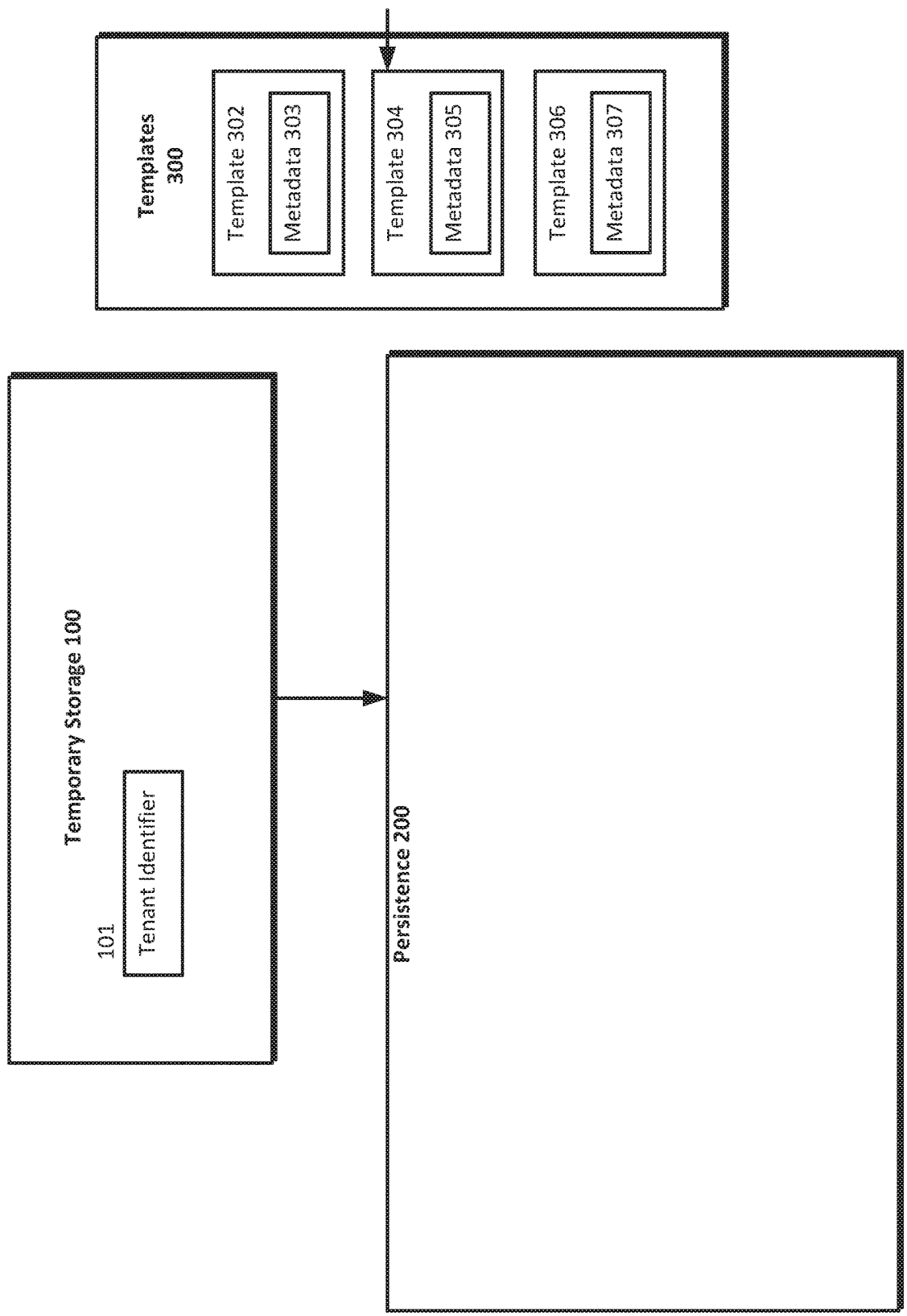

At operation 14, the database system may select template tenant metadata of a template tenant to create the new tenant. The selection of the template tenant metadata may be based on one or more attributes of the received request. That is, the database system may determine whether information and/or data in the request to create a tenant is similar to data, information, and/or metadata of the tenant templates stored by the database system (e.g., one or more of templates 300 shown in FIGS. 4A, 4B, 4D, and/or 4E). For example, the database system may select a tenant template that is most similar to the request for the creation of a new tenant. Similarities may include, for example, the type of tenant to be created, the type of data and/or metadata associated with the tenant to be created, or the like. As shown in FIG. 4B, the template 304 having metadata 305 may be selected from the templates 300 based on the request received by the system 50 shown in FIG. 4A.

At operation 16, the database system may create a new tenant identifier based on the selected template tenant metadata. For example, FIG. 4B shows the tenant identifier 101 that is created in temporary storage 100 of system 50.

At operation 18, the database system can create the new tenant by associating the new tenant identifier with a snapshot of a portion of the tenant template data at a point in time when the template tenant metadata is made accessible to the new tenant. For example, FIG. 4C shows a snapshot of the template 304 of FIG. 4B. The snapshot may be such that the template tenant data is made available to the new tenant so that the new tenant can access the tenant template data in the same manner as if a copy of the original tenant data was made, without copying underlying data. That is, the new tenant may contain references which point to the snapshot of the template tenant data at the snapshot point in time.

Figure 4E:
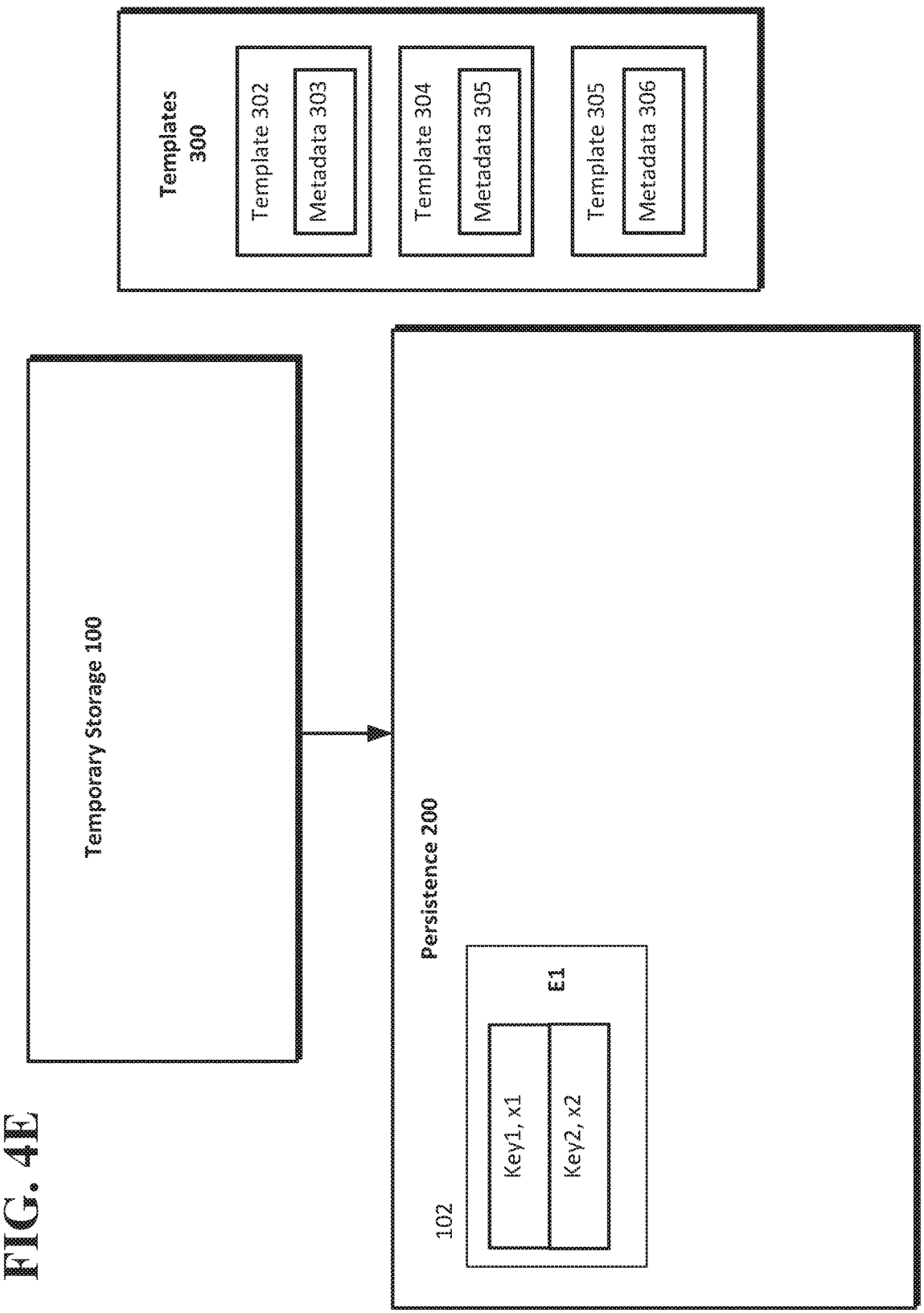

FIG. 4D shows a new tenant 102 having the tenant identifier 101 in the temporary storage 100 of system 50, as well as the keys pointing to the template tenant data of template 304. FIG. 4E shows a "flush" operation where the new tenant 102 is stored in persistent storage 200. That is, the flush operation may remove the newly-created tenant 102 from the temporary storage 100 and store it in the persistence 200.

In some implementations, tenants may be created from data that is stored in document object template (DOT) files, which may be stored, for example, in templates 300. The DOT files may be produced by selecting data row-by-row from a database, converting the data to objects (e.g., Java™ objects), and serializing the objects. For example, when a new tenant is created in a database system using method 10, the objects may be read from the DOT file, where each object is used to create a row in the database by an insert operation. When all the data has been inserted, changes such as setting permission, creating layouts, changing usernames, and the like can be made to finalize the creation of a tenant.

In some implementations, DOT files may be compressed binary files (e.g., ZIP files) that contain serialized Java™ objects. These files are produced by selecting all the data row by row from the database, converting the data into Java™ objects, serializing the Java™ objects to a storage device, and compressing the file. Typically, when Java™ objects are serialized, the data is converted into byte streams that are later convert back into the copy of the original data.

When a request to create a new tenant is received (e.g., as part of a signup request), it is determined whether the system has performed a signup using a particular template tenant (e.g., using a particular DOT file and database edition for a particular database that is receiving the request). If so, a snapshot of the template tenant (e.g., the template tenant data, the DOT file, edition information, etc.) may be used to create the new tenant. In particular, the snapshot becomes the new tenant, and has metadata that point to portions of the data of the template tenant from which the snapshot was taken.

In some implementations, when a new tenant is created, for example, at sign-up (e.g., when a new tenant is introduced to the database system), one of the DOT files may be read, and the above-described procedure may be performed in reverse. The objects may be read one at a time, and each object may be used to create a row in the database when an insert statement is issued by the database system. When the data has been inserted, changes such as setting permissions, creating layouts and changing usernames, or the like can be made. At this point, a tenant may exits that can be used by an authorized user in a database system.

In an example shown in FIGS. 4A-4E, a sign-up request may be received at a database system 50. The request may be received from a new customer's computer that is communicatively coupled to the database system 50. As a specific example, the request may be from a party that does not presently have a tenant and/or tenant data stored in the database system. Because the request is from a new party, the database system 50 may determine that it has not previously performed a sign-up for the party, and a DOT file for new customers is selected by the database system 50. The new customer DOT file may be created by selecting new customer data that is typically needed for every new tenant, such as the customer name, address, billing information, standard user roles, permissions, included services, or the like, by selecting the data from the database system 50. The selected data then may be converted into objects, which are then serialized into the DOT file as previously described. In some cases, the creation of the DOT file may be performed before the sign-up request is received.

When the new customer DOT file is selected by the database system 50, the system 50 may read the objects of the selected DOT file, and may use each object to create a row of data in, for example, the temporary storage 100, by way of an insert operation. That is, each read object may be used to create a row in the temporary storage 100 that may be associated with the tenant identifier 101. When the data has been inserted, a snapshot may be taken. The snapshot may include the DOT file and other information, such as the edition of the database. The snapshot may be stored for example, in persistence 200. One of the templates 300, such as template 304, may have metadata 305 which points to the snapshot data that is stored in persistence 200.

Based on the snapshot and the sign-up request, a new tenant identifier 101 may be generated and stored in the temporary storage 100. The database system 50 can create the new tenant by associating the new tenant identifier 101 with a snapshot of a portion of the tenant template data at a point in time when the template tenant metadata is made accessible to the new tenant. In this example, a snapshot may be taken of the template 304 of FIG. 4B. The snapshot may be such that the template tenant data of template 304 is made available to the new tenant having tenant identifier 101 so that the new tenant can access the tenant template data in the same manner as if a copy of the original tenant data was made, without copying underlying data. That is, the new tenant may contain references which point to the snapshot of the data of the template 304. As shown in FIG. 4D, a new tenant 102 may have the tenant identifier 101 as well as the keys pointing to the template tenant data of template 304. The completed tenant may be stored in persistence 200, and the tenant may be made available to the customer's computer that made the sign-up request.

Figure 1B:
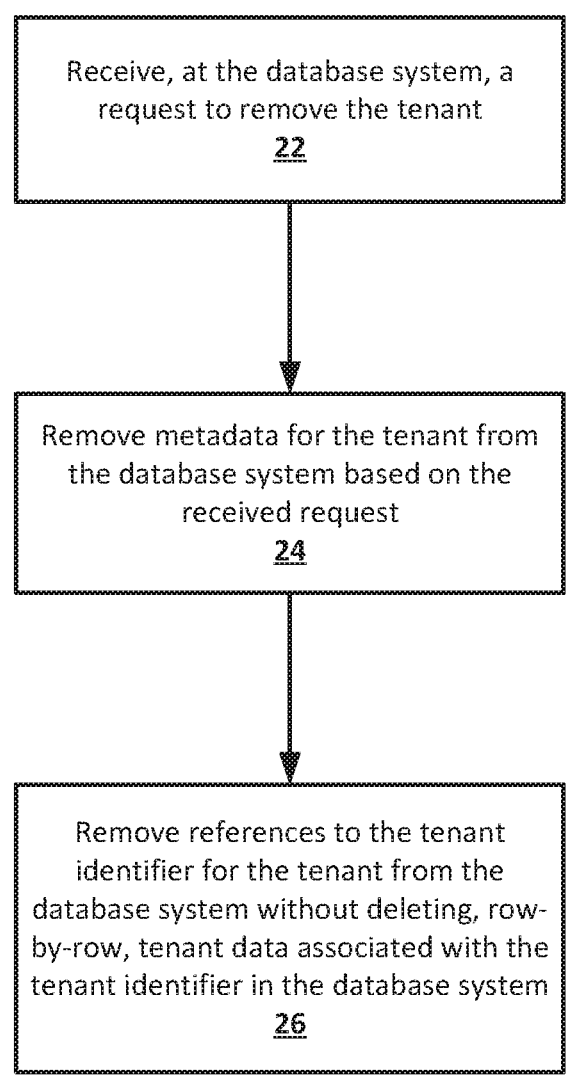
FIG. 1B shows another example method of removing a tenant from a database system by removing references to a tenant identifier according to an implementation of the disclosed subject matter.

FIG. 1B shows a method 20 for removing a tenant from a database system by removing references to a tenant identifier according to an implementation of the disclosed subject matter. The tenant for the database system created using method 10 may have tenant data stored in an immutable storage (e.g., such as in system 30 of FIG. 3, storage 810 of second computer 800 shown in FIG. 5, database systems 1200a-d of FIGS. 6A-6B, and the like) of the database system and be associated with a tenant identifier.

At operation 22, the database system may receive a request to remove a tenant. For example, computer 600, central component 700, and/or second computer 800 shown in FIG. 5 may receive a request to remove a tenant (e.g., from storage 810). In another example, one or more of database systems 1200a-1200d may receive a request to remove a tenant.

At operation 24, the database system may remove the tenant based on the received request. In some implementations, the metadata may be removed from the storage of the database system by removing at least one key associated with the metadata of the tenant without changing other tenant data. In particular, the at least one key may be removed by removing a key range associated with the metadata of a tenant from the immutable storage without removing physical data stored in the immutable storage.

At operation 26, the references to the tenant identifier for the tenant may be removed from the database system without deleting, row-by-row, tenant data associated with the tenant identified in the database system. This allows the database system to quickly and accurately remove a tenant by removing the tenant identifiers. Once the tenant identifiers have been removed, any queries to the database system to retrieve data or write data to the tenant may not be possible, as the database system may be unable to locate the tenant with the absence of the tenant identifiers.

In the method 10 of creating a tenant of a database system using template tenant metadata and the method 20 of removing a tenant from a database described in connection with FIGS. 1A-1B, as well as in the database systems described throughout in connection with FIGS. 3-6B, records that may be created or deleted may be identified as a key-value pair in the instance of a multitenant system. Tenancy in the databases may be created (e.g., by the method 10 described above in connection with FIG. 1A), and an authorized user associated with a tenancy may view, access, and/or perform operations for that tenancy. The value may be, for example, the contents of a row of a table of a relational database, an identification of a row in a table of a relational database, or any other suitable value. The key may be an identifier for the record, and may in any suitable form, such as, for example, an alphanumeric sequence. Portions of the key may provide information about the contents of the record. For example, a portion of the key may be a tenant identifier, which may uniquely identify the tenant to whom the contents of the record belong. Other portions of the key may identify, for example, a table number and identification of a row, for example, when the value of a record is the contents of a row, or table number, index number on the table, and an identification of indexed columns when the value is the identification of a row.

The database system (e.g., system 30 shown in FIG. 3, database system 50 shown in FIGS. 4A-4E, or databases 1200a, 1200b, 1200c, and/or 1200d shown in FIGS. 6A-6B) may store transactions as immutable versions of given records. Immutable versions of contents of records already stored on the server system may be unchanged until the contents are deleted (e.g., as part of method 20 described above in connection with FIG.1B, or if ever) from the server system. That is, a received transaction may create a new version of the contents of the record to be stored in the server system, instead of altering the contents of the record. Thus, it may be possible for multiple versions of a record (e.g., records having different contents) as disclosed herein to have identical keys except for transaction identifiers. The use of otherwise identical keys for versions of a given record may allow for the changing of data stored in the relational database. As such, each version of the physical record may be immutable; i.e., it is either not deleted or is not deleted over an arbitrarily long period of time that may be months, years or decades. For example, a later version of a record with an identical key (other than the transaction version identifier) to an earlier version of the record may indicate a change in the data value for that record (i.e., the change in contents of the record). Alternatively, a transaction may create a record or delete a record (i.e., create contents or delete contents). Records may be deleted (e.g., as part of method 20 shown in FIG. 1B and described above) by inserting a 'tombstone' (e.g., a marker identifying the data to be deleted), and, at a future point in time, a new extent can be written which no longer includes the record marked by the tombstone.

Time stamps or other time identifiers may be made at the creation of a tenant (e.g., as part of method 10 described above in connection with FIG. 1A). Thereafter, tenant data may interpret primary key requests for versions of the data before the time stamp by accessing the appropriate version based on the key in the pool of the data stored before the time stamp. Keys for the respective tenants accessing data created or updated after the time stamp will be interpreted to access the appropriate data created by the tenant. Alternatively, rather than using time stamps, each transaction in the database may have a unique transaction number associated with it that is monotonically increasing for each subsequent transaction and the system may note the most recently created transaction identifier in lieu of the time stamp.

Figure 2:
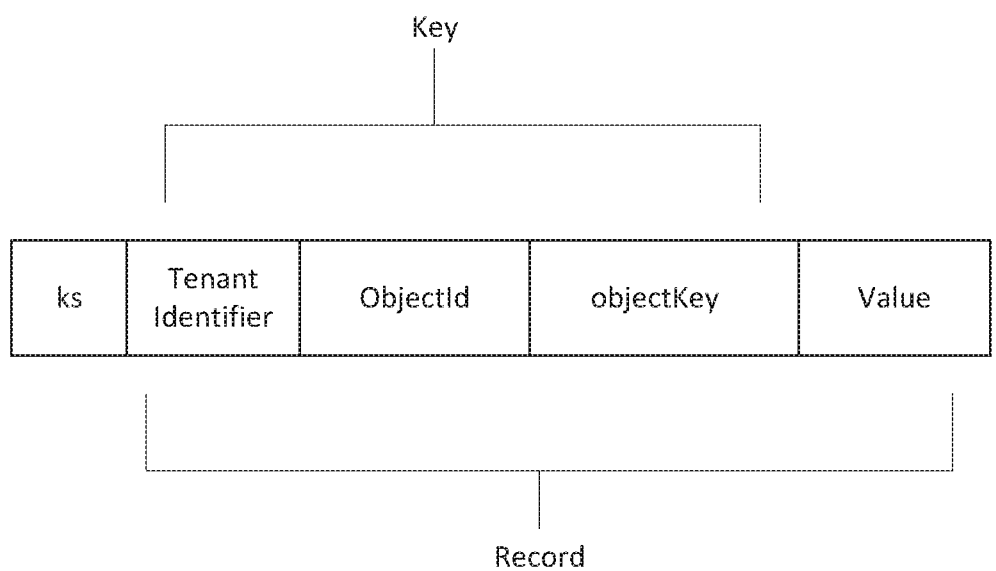
FIG. 2 shows an example of a record in a database system according to an implementation of the disclosed subject matter.

FIG. 2 shows an example record used in a database system (e.g., system 30 shown in FIG. 3, system 50 shown in FIGS. 4A-4E, database systems 1200a-1200d shown in FIGS. 6A-6B) according to an implementation of the disclosed subject matter. Records can be keyed by a keyspace (ks), a tenant identifier, an object identifier (objectId), and/or an object key (ObjectKey). As shown in FIG. 2, the record may include the tenant identifier, the objectId, and the objectKey. The key of the record may include the tenant identifier, the objectId, and the objectKey. In implementations of the disclosed subject matter, the keys and/or the values may be variable in length. As discussed above, data extents in implementations of the disclosed subject matter may be sorted by key, and organized by levels in a LSM tree according to a commit time. The database system as disclosed herein may have an immutable storage, which may be used in relational database that stores persistent contents of records, a single key space rooted by a tenant identifier, and by using persistence virtualization. The persistence may be made up of extents. An extent is a typically contiguous region of storage which may be used to store data. As discussed above, extents may be immutable and may be ordered by key.

In implementations of the disclosed subject matter, data extent references may be organized into level. A level may cover a single key range that may be grouped into data extents references that are ordered by key.

Reducing and/or minimizing a number of levels of organized data may increase the rewriting of data as new data arrives. Each level may have a maximum size threshold, and the level sizing may increase exponentially. When the size threshold is exceeded, a merge operation may be performed by the database system (e.g., system 30 of FIG. 3, system 50 of FIGS. 4A-4E, and/or database systems 1200a-1200d shown in FIGS. 6A-6B), where data is merged from level N to level N+1.

Data is not moved from the memory storage of the database system (e.g., memory storage 1230 shown in FIG. 6B) until data has been made persistent via a flush operation, and queries have moved up to latest view of persistence. For example, in a flush operation, data is copied from the memory storage 1230 to the storage 1260 shown in FIG. 6B. That is, in the flush operation, one or more extents are moved from the memory storage 1230 to the storage 1260 (i.e., persistent storage). This may be done in key order for a particular transaction range.

FIG. 3 shows an example system for inserting a new tenant, updating tenant records, and/or removing a tenant by removing tenant identifiers, such as shown in FIGS. 1A, 1B, and 4A-4E and described throughout, according to an implementation of the disclosed subject matter. As discussed above, for example, in connection with FIG. 2, system 30 may store transactions as immutable versions of given records. The system 30 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. For simplicity, components such as the processor, short and long term storage, the operating system, much of the database management system are not shown. The server system 30 may be part of a computing system and network infrastructure, or may be otherwise connected to the computing system and network infrastructure, including a larger server network which may include other server systems similar to the server system 30. In some implementations, the system 30 may be the computer 600, central component 700, and or the second computer 800 shown in FIG. 5, and/or one or more of the database systems 1200a-1200d shown in FIGS. 6A-6B.

Figure 5:
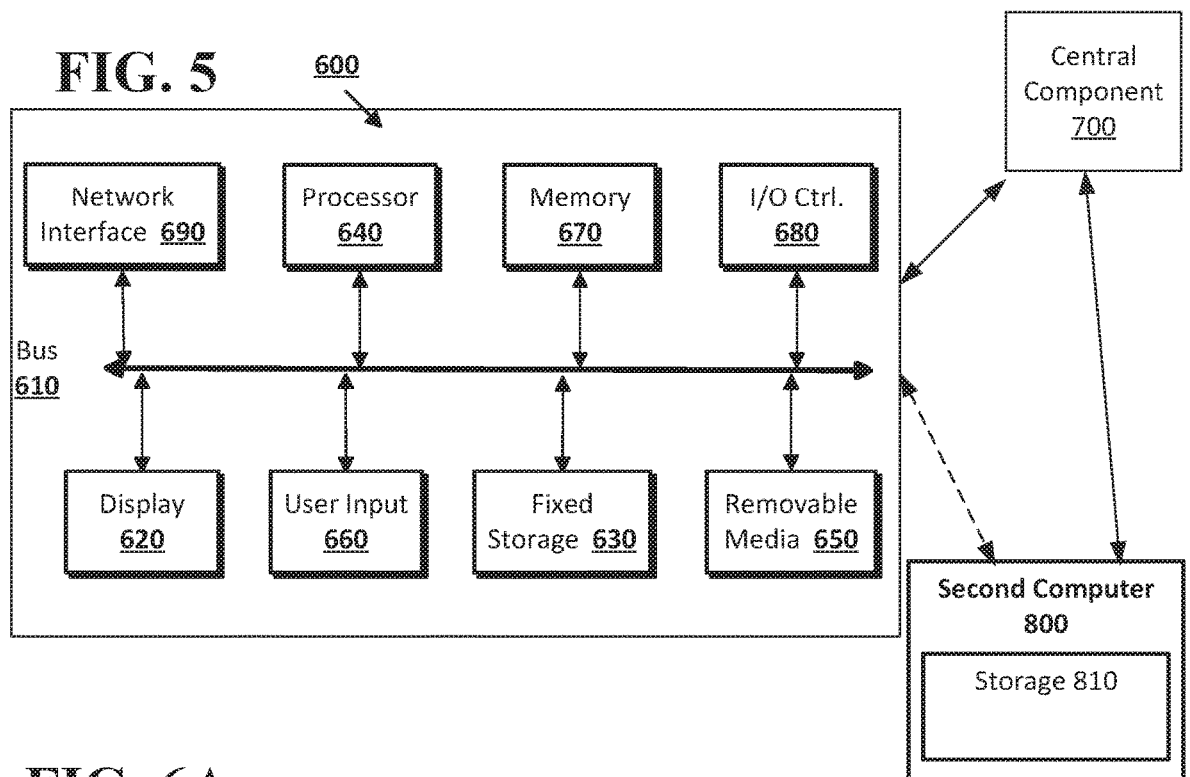
FIG. 5 shows a computer according to an implementation of the disclosed subject matter.

As shown in FIG. 3, an access layer 32 of the system 30 may have a database storage engine 33, which may receive a query and/or instruction for the database system (e.g., central component 700 shown in FIG. 5 and/or database systems 1200a-1200d shown in FIGS. 6A-6B) from a computing device (e.g., computer 600 and/or a second computer 800 shown in FIG. 5). The query may be for particular data from a tenant, and/or may be an instruction to add a tenant, insert and/or update data of a tenant, and/or delete a tenant identifier. The database storage engine 33 may be any suitable combination of hardware and software on the server system 30 for receiving queries for the database system, and retrieving data related to the received query and/or instruction.

The system 30 may include a virtualization layer 34, which may have an extent reference 35, which may refer to tenant data stored in the physical storage 36 as extent 37. In some implementations, the extent reference 35 may be part of the central component 700 shown in FIG. 5 and/or database systems 1200a-1200d shown in FIGS. 6A-6B. The extent reference 35 may be any suitable combination of hardware and software on the system 30 to perform as the virtualization layer 34 between the database storage engine 33 and physical storage 36 (e.g., where extents may be stored as part of extent 37). The physical storage 36 may be semiconductor memory, a solid-state drive (SSD), hard disk drive, optical memory, an optical storage device, or any other suitable physical data storage medium, or some combination thereof.

When a new tenant is created by system 30, for example, using the method 10 shown in FIG. 1A and described above, the extent reference 35 can be created as a tenant identifier, and the extent reference 35 can be associated with a new tenant which has tenant data stored as part of extent 37 in the physical storage 36.

When the system 30 receives an instruction to remove a tenant, for example, using the method 20 shown in FIG. 1B and described above, the extent reference 35 which is associated with the extent 37 may be removed without deleting the tenant data stored in the physical storage 36.

In implementations of the disclosed subject matter, data can be virtualized in system 30 and can be mapped using the virtualization layer 34. This may allow for use of tenant templates to create new tenants in a database system, such as system 30. A snapshot of the template tenant data can be taken at a point in time, and references (e.g., extent reference 35) in the new tenant can point to the snapshot of the template tenant data so that the data does not have to be copied. The virtualization of data also allows for deletion of a tenant by removing the references (e.g., the extent reference 35 in virtualization layer 34) to a tenant in the database system.

Implementations of the presently disclosed subject matter may be implemented in and used with a variety of component and network architectures. FIG. 5 is an example computer 600 suitable for implementing implementations of the presently disclosed subject matter. As discussed in further detail herein, the computer 600 may be a single computer in a network of multiple computers. As shown in FIG. 5, the computer 600 may communicate with a central or distributed component 700 (e.g., server, cloud server, database, cluster, application server, etc.). The central component 700 may communicate with one or more other computers such as the second computer 800, which may include a storage device 810. The second computer 800 may be a server, cloud server, or the like. The storage 810 may use any suitable combination of any suitable volatile and non-volatile physical storage mediums, including, for example, hard disk drives, solid state drives, optical media, flash memory, tape drives, registers, and random access memory, or the like, or any combination thereof.

Data may be stored in any suitable format in, for example, the storage 810, using any suitable filesystem or storage scheme or hierarchy. For example, the storage 810 may store data using a log structured merge (LSM) tree with multiple levels. Further, if the systems shown in FIGS. 4-5 are multitenant systems, the storage may be organized into separate log structured merge trees for each instance of a database for a tenant. That is, there may be separate databases (e.g., LSM trees) for each tenant. Alternatively, contents of all records on a particular server or system may be stored within a single log structured merge tree, in which case unique tenant identifiers associated with versions of records may be used to distinguish between data for each tenant as disclosed herein. More recent transactions may be stored at the highest or top level of the tree and older transactions may be stored at lower levels of the tree.

The information obtained to and/or from a central component 700 may be isolated for each computer such that computer 600 may not share information with computer 800. Alternatively, or in addition, computer 600 may communicate directly with the second computer 800.

The computer (e.g., user computer, enterprise computer, etc.) 600 includes a bus 610 which interconnects major components of the computer 600, such as a central processor 640, a memory 670 (typically RAM, but which may also include ROM, flash RAM, or the like), an input/output controller 680, a user display 620, such as a display or touch screen via a display adapter, a user input interface 660, which may include one or more controllers and associated user input or devices such as a keyboard, mouse, Wi-Fi/cellular radios, touchscreen, microphone/speakers and the like, and may be closely coupled to the I/O controller 680, fixed storage 630, such as a hard drive, flash storage, Fibre Channel network, SAN device, SCSI device, and the like, and a removable media component 650 operative to control and receive an optical disk, flash drive, and the like.

The bus 610 enable data communication between the central processor 640 and the memory 670, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 600 can be stored on and accessed via a computer readable medium, such as a hard disk drive (e.g., fixed storage 630), an optical drive, floppy disk, or other storage medium 650.

The fixed storage 630 may be integral with the computer 600 or may be separate and accessed through other interfaces. The fixed storage 630 may be part of a storage area network (SAN). A network interface 690 may provide a direct connection to a remote server via a telephone link, to the Internet via an internet service provider (ISP), or a direct connection to a remote server via a direct network link to the Internet via a POP (point of presence) or other technique. The network interface 690 may provide such connection using wireless techniques, including digital cellular telephone connection, Cellular Digital Packet Data (CDPD) connection, digital satellite data connection or the like. For example, the network interface 690 may enable the computer to communicate with other computers and/or storage devices via one or more local, wide-area, or other networks, as shown in FIG. 5.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIG. 5 need not be present to practice the present disclosure. The components can be interconnected in different ways from that shown. Code to implement the present disclosure can be stored in computer-readable storage media such as one or more of the memory 670, fixed storage 630, removable media 650, or on a remote storage location.

Figure 6A:
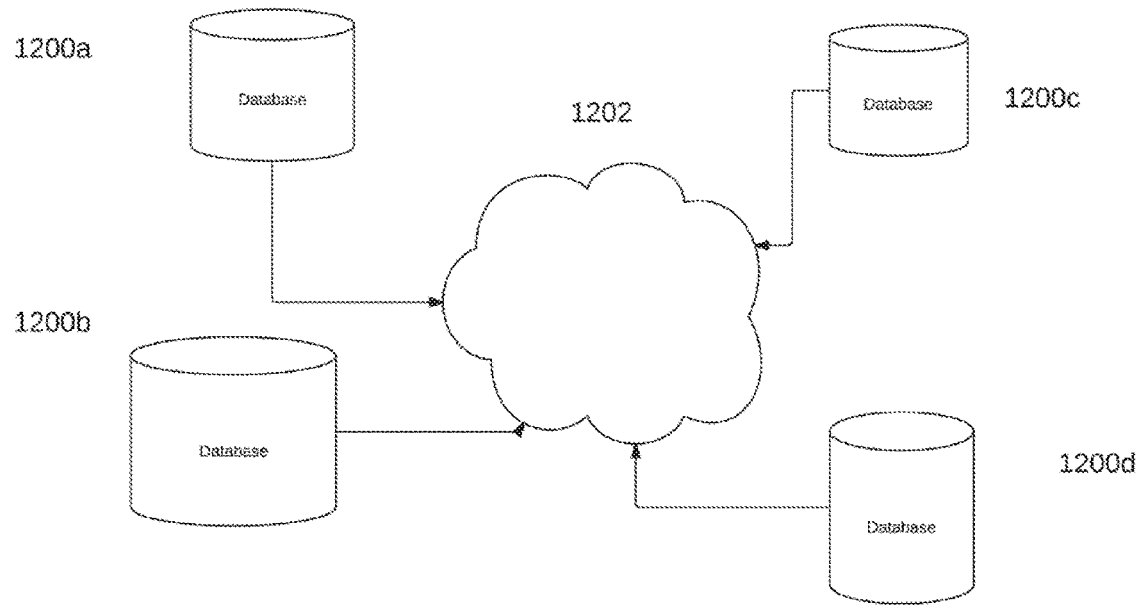

FIGS. 6A-6B shows an example network arrangement according to an implementation of the disclosed subject matter. Four separate database systems 1200*a-d* at different nodes in the network represented by cloud 1202 communicate with each other through networking links 1204 and with users (not shown). Each of database systems 1200 may be operable to host multiple instances of a database, where each instance is accessible only to a particular tenant (e.g., users associated with a particular tenant who are authorized to access the data of the tenant). Each of the database systems may constitute a cluster of computers along with a storage area network (not shown), load balancers and backup servers along with firewalls, other security systems, and authentication systems. Some of the instances at any of systems 1200 may be live or production instances processing and committing transactions received from users or from computing elements (not shown) for ingesting and providing data for storage in the instances.

One or more of the database systems 1200*a-*1200*d* may create a new tenant using tenant template data at any time when a request is received. The system, for example 1200*c*, may include at least one storage device, as shown in FIGS. 6A-6B, which may store template data. For example, the storage may include memory 670, fixed storage 630, removable media 650, a storage device included with the central component 700 and/or the second computer 800, and/or one or more storage devices associated with one or more of the database systems 1200*a-*1200*d*. Tenant data and/or tenant template data may be stored in an immutable storage of the at least one storage device associated with a tenant identifier.

FIG. 6B shows an individual database system 1200*a*, 1200*b*, 1200*c*, or 1200*d* according to an implementation of the disclosed subject matter. The database systems 1200*a-*1200*c* may have storage 1260, which may include one or more storage devices that provide persistent storage of data (e.g., tenant data). The database system 1200*a*, 1200*b*, 1200*c*, or 1200*d* may include one or more applications 1210, which may use data and/or information from the node 1220 and/or the storage 1260, which may be one or more storage devices. Applications 1210 may include customer relationship management (CRM) applications or the like. Storage 1260 may be one or more storage devices, and may store data extents 1270 which may include tenant data.

Implementations of the disclosed subject matter may also provide a system to create a tenant of a database system. At least one of the computer 600, the central component 700, the second computer 800, and/or one or more of the database systems 1200*a-*1200*d* may receive a request to create a new tenant, and select template tenant metadata of a template tenant to create the new tenant based on the received request. A new tenant identifier may be based on the selected template tenant metadata, and the new tenant may be created by associating the new tenant identifier with a snapshot of at least a portion of the template tenant metadata at a point in time when the template tenant metadata is made accessible to the new tenant. At least one storage device, such as storage 810 and/or one or more of database systems 1200*a-*1200*d* may store tenant data associated with the tenant identifier and the template tenant.

The computer 600, the central component 700, and/or one or more of the database systems 1200*a-*1200*d* may associate new tenant data created by the new tenant after the new tenant creation point in time with the new tenant.

The computer 600, the central component 700, and/or one or more of the database systems 1200*a-*1200*d* may select the template tenant metadata of the template tenant by determining whether a template tenant exists based on a type of the request to form a new tenant. The computer 600, the central component 700, and/or one or more of the database systems 1200*a-*1200*d* may create the new tenant by associating the new tenant identifier with the snapshot of at least a portion of the template tenant metadata of the determined template tenant at a point in time when the new tenant is to be created.

When the new tenant is created, the computer 600, the central component 700, and/or one or more of the database systems 1200*a-*1200*d* may change tenant data of the new tenant by changing at least one of a setting a permission, changing a layout, and changing a username.

The computer 600, the central component 700, and/or one or more of the database systems 1200*a-*1200*d* may remove a tenant of a database system. The system may include at least one storage device, such as the storage 810 and/or the database systems 1200*a-*1200*d* to store tenant data associated with a tenant identifier. The computer 600, the central component 700, and/or one or more of the database systems 1200*a-*1200*d* may receive a request to remove the tenant from the at least one storage device, remove metadata for the tenant from the database system based on the received request, and remove references to the tenant identifier for the tenant from the database system. This may be done without deleting, row-by-row, tenant data associated with the tenant identifier in the database system.

In some implementations, the computer 600, the central component 700, and/or one or more of the database systems 1200*a-*1200*d* may remove the metadata by removing at least one key associated with the tenant without changing other tenant data. The computer 600, the central component 700, and/or one or more of the database systems 1200*a-*1200*d* may remove the at least one key by removing a key range associated with the metadata of a tenant from the immutable storage without removing physical data stored in the storage.

The systems and methods of the disclosed subject matter may be for single tenancy and/or multitenancy systems. Multitenancy systems may allow various tenants, which may be, for example, users, groups of users, or organizations, to access their own records on the server system through software tools or instances on the server system that may be shared among the various tenants. The contents of records for each tenant may be part of a database containing that tenant. Contents of records for multiple tenants may all be stored together within the same database, but each tenant may only be able to access contents of records which belong to, or were created by, that tenant. This may allow a database system to enable multitenancy without having to store each tenants' contents of records separately, for example, on separate servers or server systems. The database for a tenant may be, for example, a relational database, hierarchical database, or any other suitable database type. All records stored on the server system may be stored in any suitable structure, including, for example, a LSM tree.

A multitenant system may have various tenant instances on server systems distributed throughout a network with a computing system at each node. The live or production database instance of each tenant may only have its transactions processed at one computer system. The computing system for processing the transactions of that instance may also process transactions of other instances for other tenants.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as may be suited to the particular use contemplated.

The invention claimed is:

1. A computerized method for creating a tenant of a database system, the tenant to have tenant data stored in an immutable storage of the database system associated with a tenant identifier, the method comprising:
   receiving, at the database system, a request to create a new tenant;
   selecting, at the database system, a template tenant to create the new tenant, wherein the template tenant is stored in a document object template file that is generated by selecting data from the immutable storage of the database system, converting the selected data to objects, and serializing the objects, wherein the template tenant includes template tenant metadata and template tenant data, and wherein the template tenant to create the new tenant is selected based on data from the received request that includes a type of tenant to be created, a type of data associated with the tenant to be created, and a type of metadata associated with the tenant to be created;
   creating, via the database system, a new tenant identifier based on the selected template tenant metadata;
   creating the new tenant by associating the new tenant identifier and keys of the new tenant with a snapshot of at least a portion of the template tenant metadata at a point in time when the template tenant metadata is made accessible to the new tenant by having the new tenant identifier point to the template tenant metadata without copying the template tenant data of the template tenant and other tenant-specific data, wherein the new tenant identifier and the keys of the new tenant are configured to point to the snapshot of the at least a portion of the template tenant metadata, and the keys are identifiers of one or more records in the database system; and
   associating new tenant data created by the new tenant after the new tenant creation point in time with the new tenant, wherein the new tenant data created by the new tenant subsequent to the new creation point in time is inaccessible to the template tenant.

2. The method of claim 1, wherein the selecting the template tenant metadata of the template tenant comprises:
   determining whether a template tenant exists based on a type of the request to form a new tenant; and
   creating the new tenant by associating the new tenant identifier with the snapshot of at least a portion of template tenant metadata of the determined template tenant at a point in time when the new tenant is to be created.

3. The method of claim 1, further comprising:
   when the new tenant is created, changing tenant data of the new tenant by changing at least one from the group consisting of: setting a permission, changing a layout, and changing a username.

4. A system to create a tenant of a database system, the system comprising:
   at least one server to receive a request to create a new tenant, select a template tenant to create the new tenant, wherein the template tenant is stored in a document object template file that is generated by selecting data from the immutable storage of the database system, converting the selected data to objects, and serializing the objects, wherein the template tenant includes template tenant metadata and template tenant data, wherein the selected template tenant is used to create the new tenant which is based on data from the received request that includes a type of tenant to be created, a type of data associated with the tenant to be created, and a type of metadata associated with the tenant to be created, create a new tenant identifier based on the selected template tenant metadata, and create the new tenant by associating the new tenant identifier and keys of the new tenant with a snapshot of at least a portion of the template tenant metadata at a point in time when the template tenant metadata is made accessible to the new tenant by having the new tenant identifier point to the template tenant metadata without copying the template tenant data of the template tenant and other tenant-specific data, wherein the new tenant identifier and the keys of the new tenant are configured to point to the snapshot of the at least a portion of the template tenant metadata, and the keys are identifiers of one or more records in the database system, and wherein the at least one server associates new tenant data created by the new tenant after the new tenant creation point in time with the new tenant, and wherein the new tenant data created by the new tenant subsequent to the new creation point in time is inaccessible to the template tenant; and at least one storage device to store tenant data associated with the tenant identifier and the template tenant.

5. The system of claim 4, wherein the at least one server selects the template tenant metadata of the template tenant by determining whether a template tenant exists based on a type of the request to form a new tenant and creating the new tenant by associating the new tenant identifier with the snapshot of at least a portion of the template tenant metadata of the determined template tenant at a point in time when the new tenant is to be created.

6. The system of claim 4, wherein when the new tenant is created, the at least one server changes tenant data of the new tenant by changing at least one from the group consisting of: setting a permission, changing a layout, and changing a username.

\* \* \* \* \*